(12) United States Patent
Travostino et al.

(10) Patent No.: US 6,400,143 B1
(45) Date of Patent: *Jun. 4, 2002

(54) DIGITAL SENSOR OF RELATIVE POSITION

(75) Inventors: Francis Travostino, Annecy-le-Vieux (FR); A. John Santos, Farmington, CT (US); Mark E. LaCroix, New Hartford, CT (US); Stephen J. Lyle, Torrington, CT (US)

(73) Assignee: The Torrington Company, Torrington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/160,307

(22) Filed: Sep. 25, 1998

(30) Foreign Application Priority Data

Sep. 26, 1997 (FR) .............................. 97 12034

(51) Int. Cl.$^7$ ................................. G01B 7/30
(52) U.S. Cl. ............................. 324/207.22; 324/207.2; 324/207.21; 324/207.25; 324/174; 340/671
(58) Field of Search ................. 324/207.13, 207.15, 324/207.2, 207.22, 207.25, 178–179, 207.21, 173, 174; 340/671; 341/15; 338/32 R, 32 H

(56) References Cited

U.S. PATENT DOCUMENTS

| 4,587,485 A | 5/1986 | Papiernik | .................... 324/166 |
| 5,602,471 A | 2/1997 | Muth et al. | ............. 324/207.21 |
| 5,898,301 A * | 4/1999 | La Croix et al. | ........ 324/207.22 |

FOREIGN PATENT DOCUMENTS

DE          37 37 7210          3/1989

* cited by examiner

Primary Examiner—Jay Patidar
(74) Attorney, Agent, or Firm—John C. Bigler

(57) ABSTRACT

The invention relates to a digital sensor of relative position, which has a circular multipolar magnetic ring which is mobile in rotation opposite a stationary magnetic sensor comprised of at least two sensitive elements, respectively positioned facing a main track and a "revolution tick" reference track, and a device for processing of the output signals, such that on the magnetic ring, a magnetic pattern is produced from a pair of north and south poles whose transition is different from the transition between the other north and south poles of the magnetic ring, and of which the angular width of the north pole is different at the site of the "revolution tick" reference track. The sensitive elements can be three in number, the first of which faces reference track and of which the other two face the main track, or they can be produced in the form of two parallel bars.

16 Claims, 15 Drawing Sheets

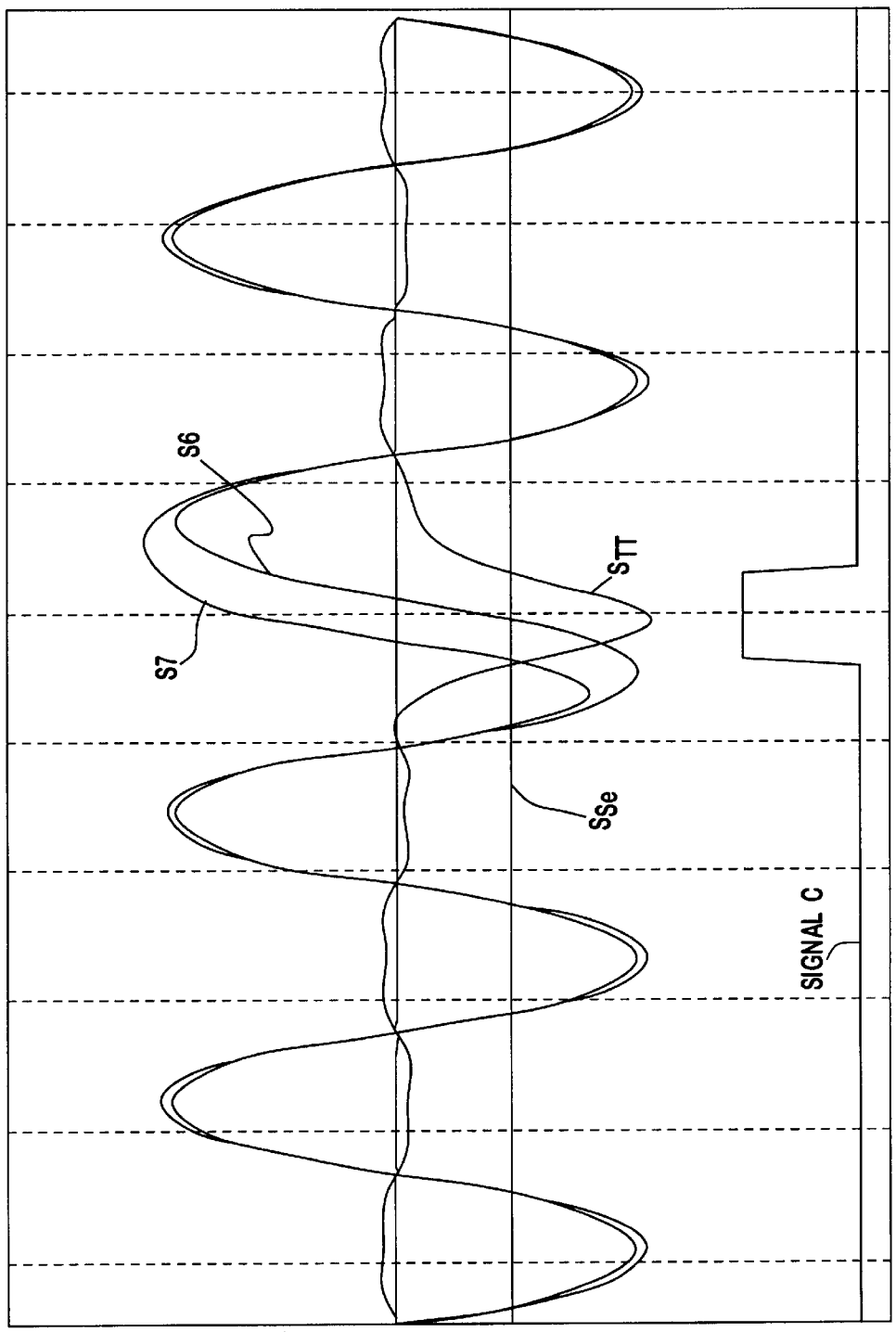

DIGITAL SENSOR OF RELATIVE POSITION

BACKGROUND OF THE INVENTION

This invention relates generally to a digital sensor of relative position, of the magnetic type, which delivers one reference pulse per revolution, and, more particularly, to a sensor suitable for use in sensor bearings for automobile or industrial applications.

Such sensors can be mounted, for example, in wheel bearings or in steering column bearings of automobiles in order to instruct the navigation systems or to control the trajectory of the vehicle, or in systems for checking and controlling of the position of a robot or of an electric motor. A relative position sensor which moreover delivers an output signal, called a "revolution tick", consisting of a single pulse per revolution, whose length or duration can vary as a function of the devices, is of great interest because this signal can be used as a reference for performing the reinitialization of the processing systems connected downstream from the sensor, and for knowing, by counting up or counting down, the position of a rotor with respect to this reference position.

Figure 1:
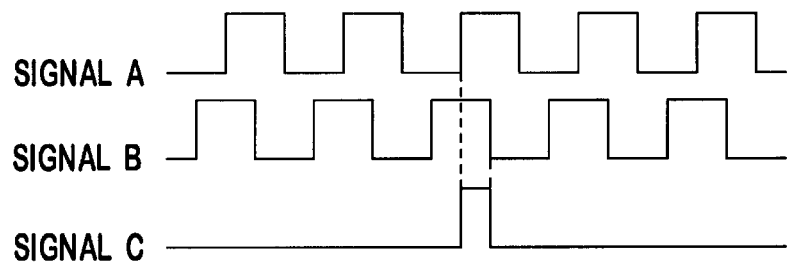

There are currently relative position sensors of the optical encoder type, which deliver, as output, digital signals, each having a determined number of pulses per revolution and phase shifted by 90 degrees with respect to one another in order to discriminate the direction of rotation. Such signals are represented in FIG. 1, in which they are referenced A and B, and so is a "revolution tick" reference signal C, consisting of a single pulse per revolution, whose rising front corresponds to any front of one of the two signals A or B, but whose descending front corresponds to the next front of the other signal. For reasons of reliability, the use of these sensors of optical type is limited to applications executed in environments which are not very severe, with a low level of pollution and a surrounding temperature less than 100° C.

There are also sensors of the magnetic type which can function under more severe industrial conditions and which are economically advantageous. They can consist, on one hand, of a multipolar magnetic ring, on which a sequence of north and south poles is provided and which is connected to the mobile part of the component in rotation whose relative position is sought, and on the other hand, of one or more magnetic sensors connected to the stationary part of the component in rotation. These magnetic sensors are, for example, Hall-effect probes or magnetoresistant probes which can be integrated in bearings.

In contrast, in the case in which such a relative position sensor, of the magnetic type, has to deliver a "revolution tick" reference information signal, the magnetic tracks, main and "revolution tick" tracks, must be sufficiently separated from one another because of the great magnetic influences exerted between them, causing a great space requirement, which is particularly true if one wishes to use the signals coming from the main track in order to increase electronically the resolution of the output signals by known interpolation processes. This disadvantage can prevent such a sensor from being mounted in certain components, in which there is little room.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a digital sensor of relative position, which comprises, on one hand, a circular multipolar magnetic ring, on which are magnetized a number of pairs of north and south poles, which are equally distributed, of constant determined angular width, mobile in rotation opposite a stationary magnetic sensor composed of at least two sensitive elements, which are located on a radius (r) of the magnetic ring and a length (d) apart, respectively positioned facing a main track and a "revolution tick" reference track, and on the other hand, a device for processing of output signals emitted by the sensitive elements, for providing one reference pulse per revolution of a component in rotation connected with the magnetic ring, wherein, on the magnetic ring, a magnetic pattern is produced from a pair of north and south poles whose transition is different from the transition between other north and south poles of the magnetic ring, and of which the angular width of the north pole is, on one hand, equal to that of the south pole at the main track, and on the other hand, different at the "revolution tick" reference track.

According to another aspect of the invention, the magnetic sensor is comprised of three sensitive elements, the first of which faces the "revolution tick" reference track, and of which the second and third sensitive elements face the main magnetic track in such a way that one of the two is located on the same radius of the magnetic ring as the first sensitive element a distance (d) apart, and that they are offset with respect to one another along the main track in order to deliver respective signals in quadrature.

According to another aspect of the invention, the magnetic sensor is comprised of two small bars of sensitive magnetic elements, located facing the two tracks, the main magnetic track and the "revolution tick" reference track, the two small bars of sensitive magnetic elements being parallel and a length (d) apart, being comprised of a number of sensitive elements, preferably in an even number and an equal number for the two bars, each sensitive element of one bar facing a sensitive element of the other bar.

The foregoing and other aspects will become apparent from the following detailed description of the invention when considered in conjunction with the accompanying drawing figures.

BRIEF DESCRIPTION OF THE DRAWING FIGURES

Figure 5:
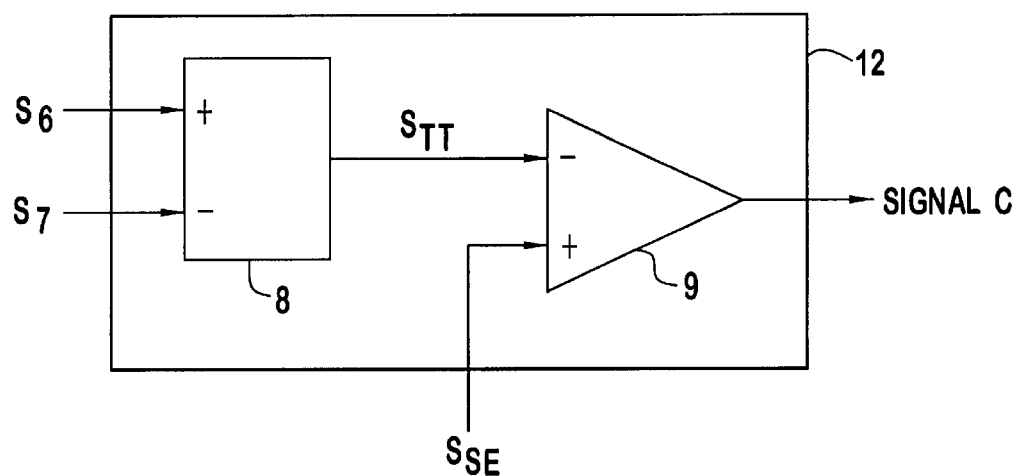
Figure 2:
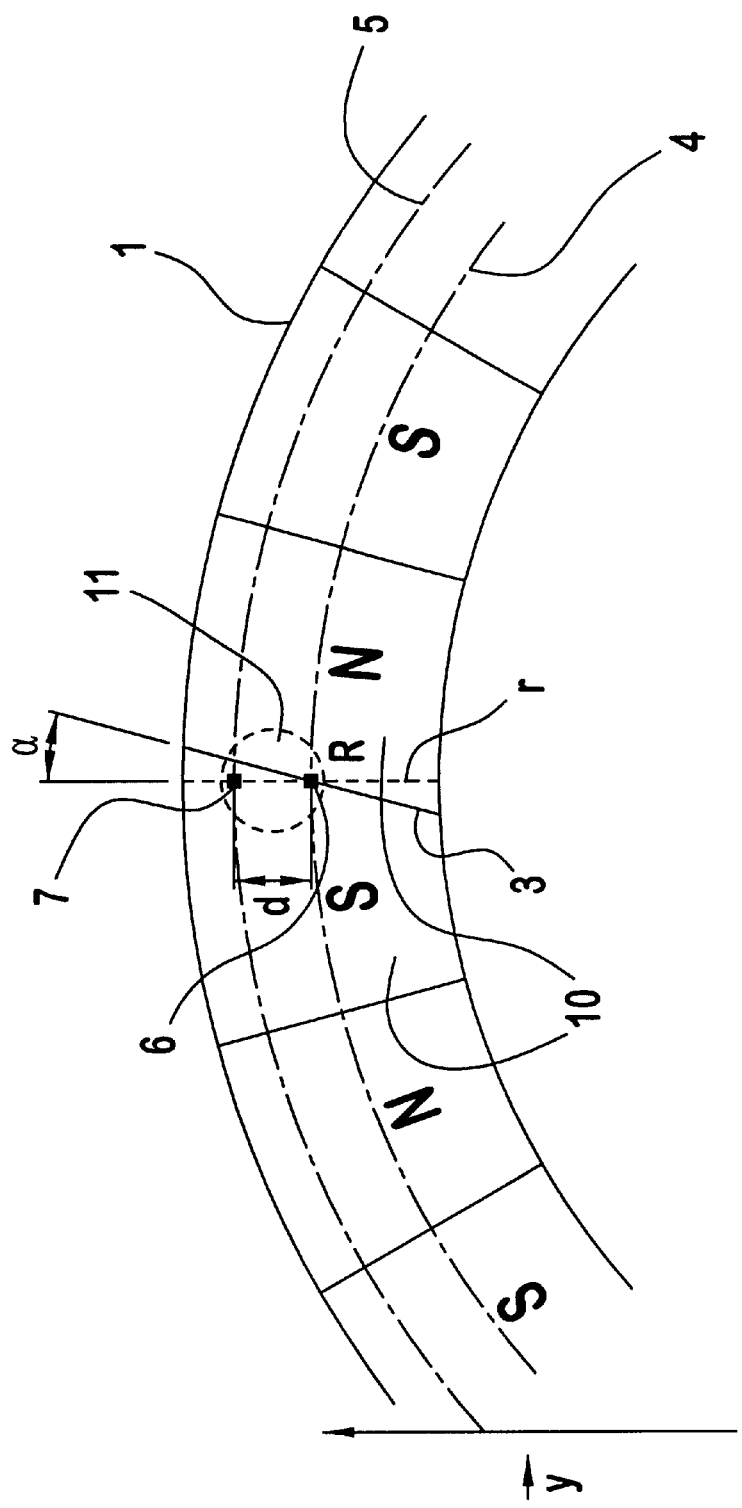
Figure 7:
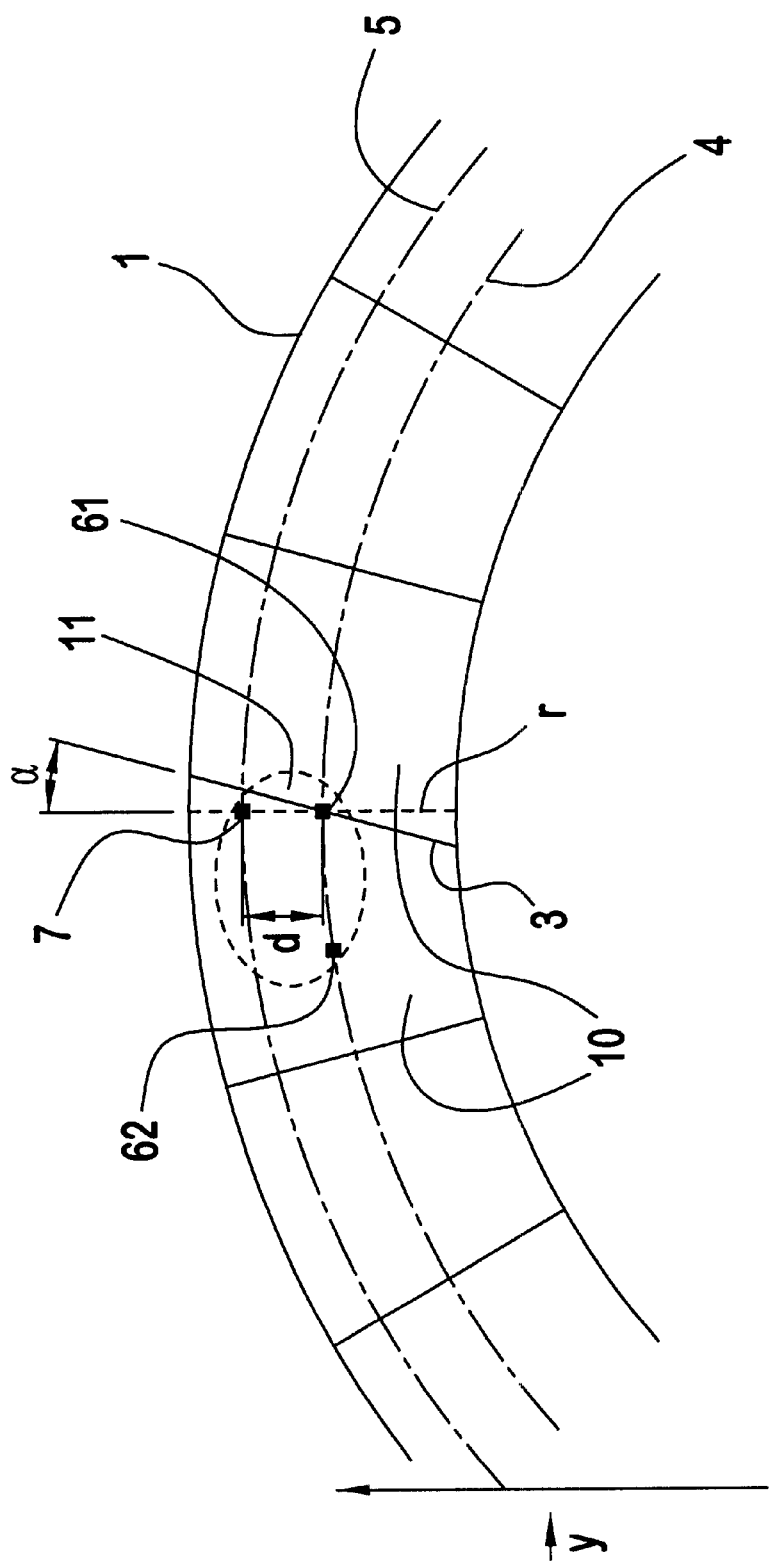
Figure 8:
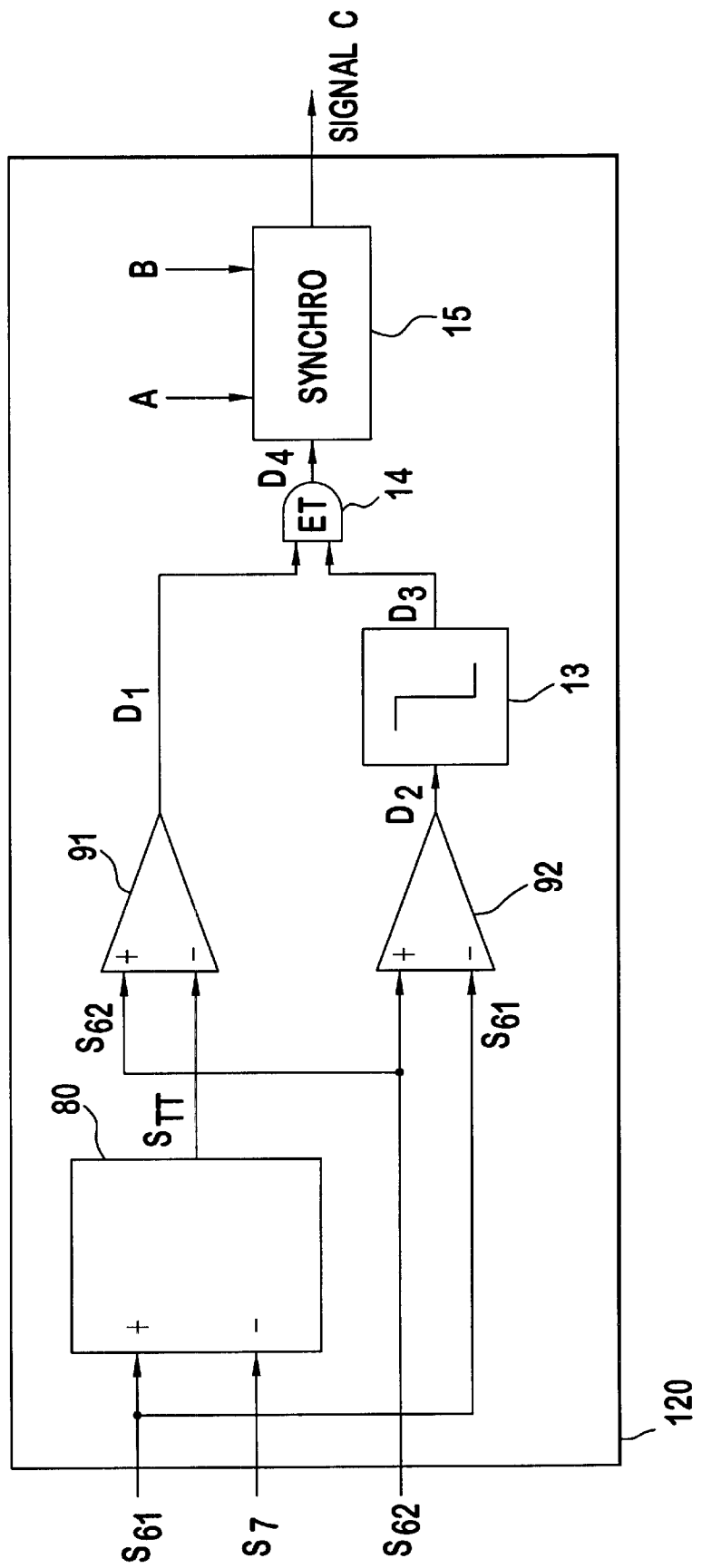
Figure 9:
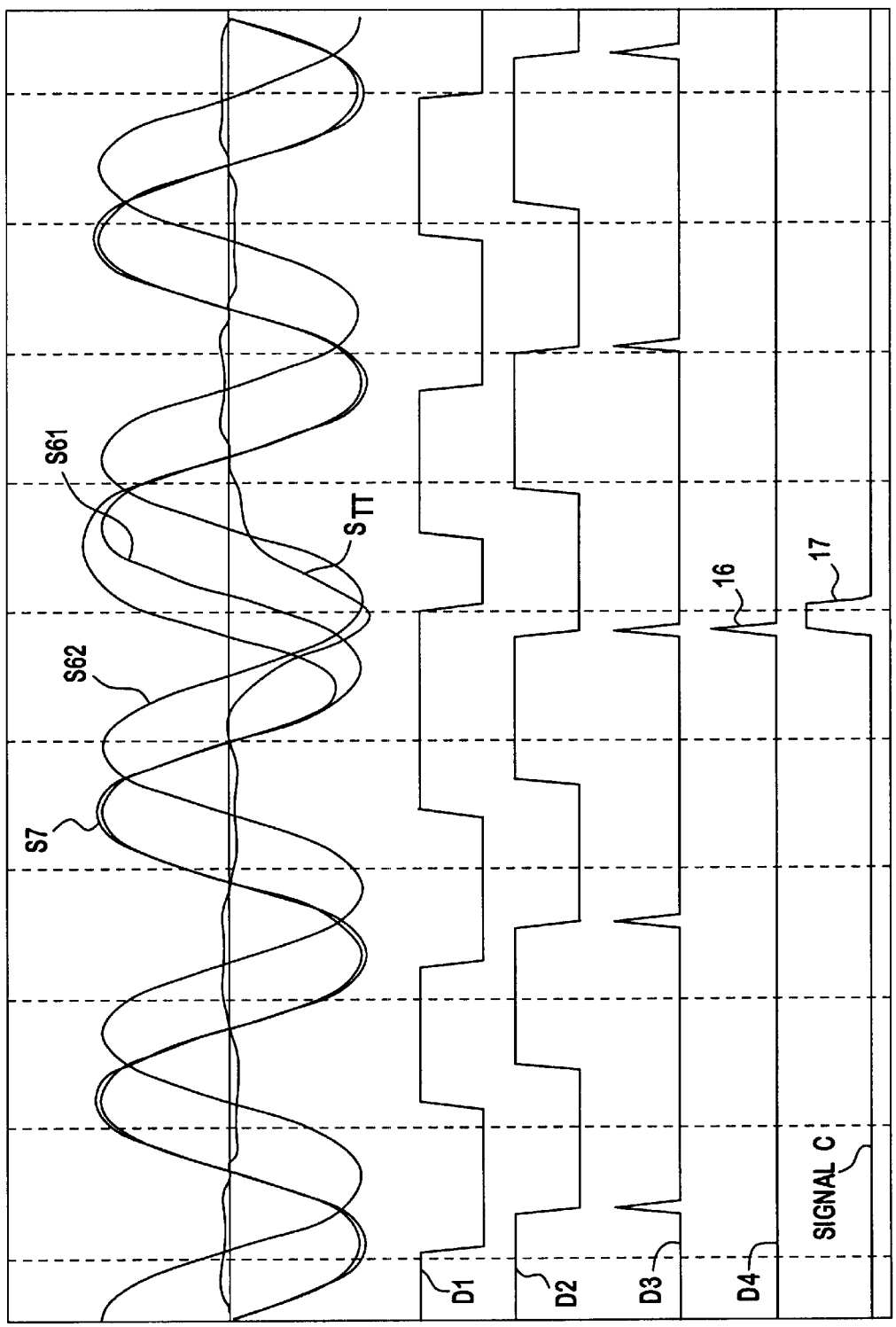
Figure 10:
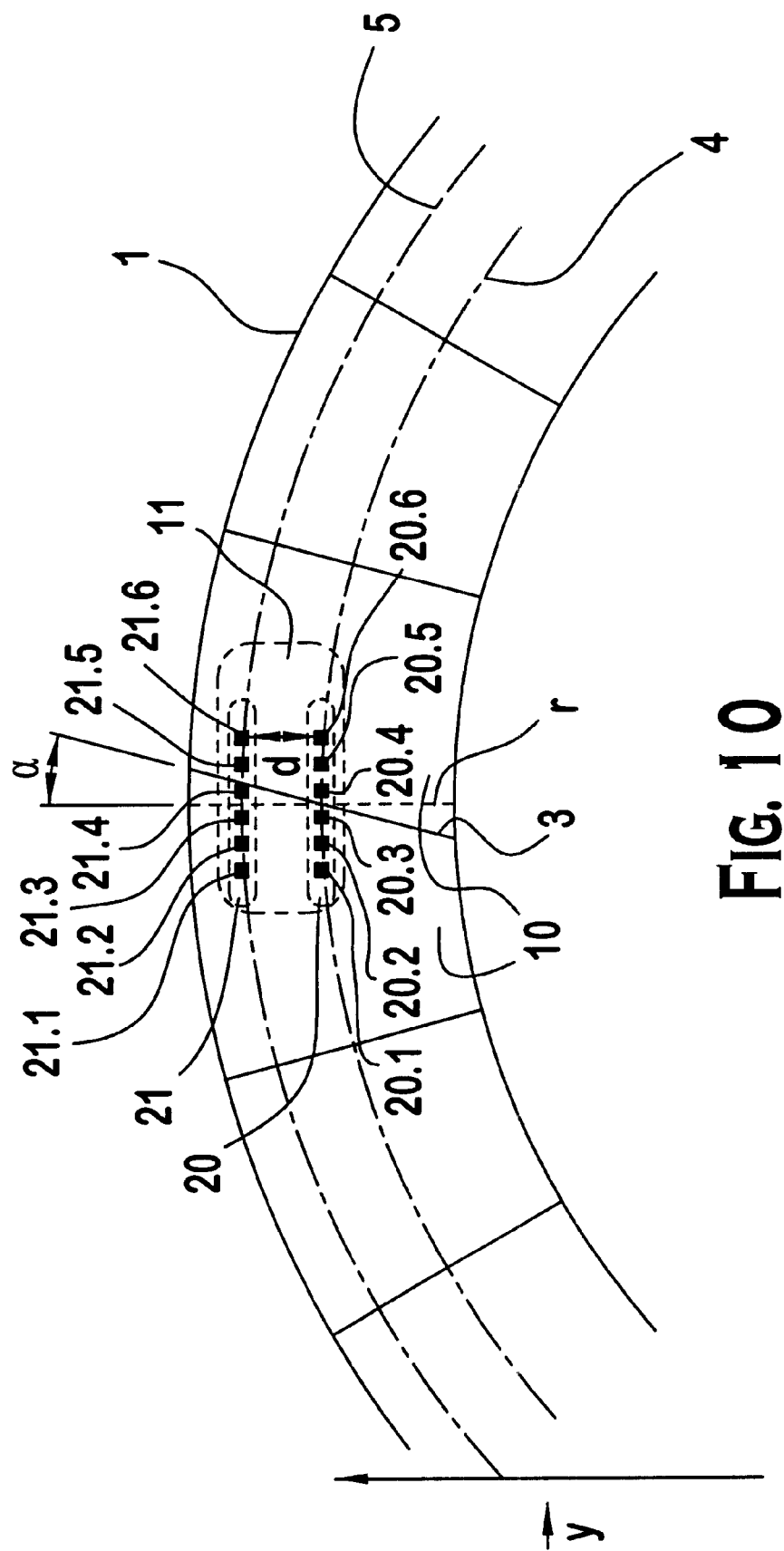
Figure 11:
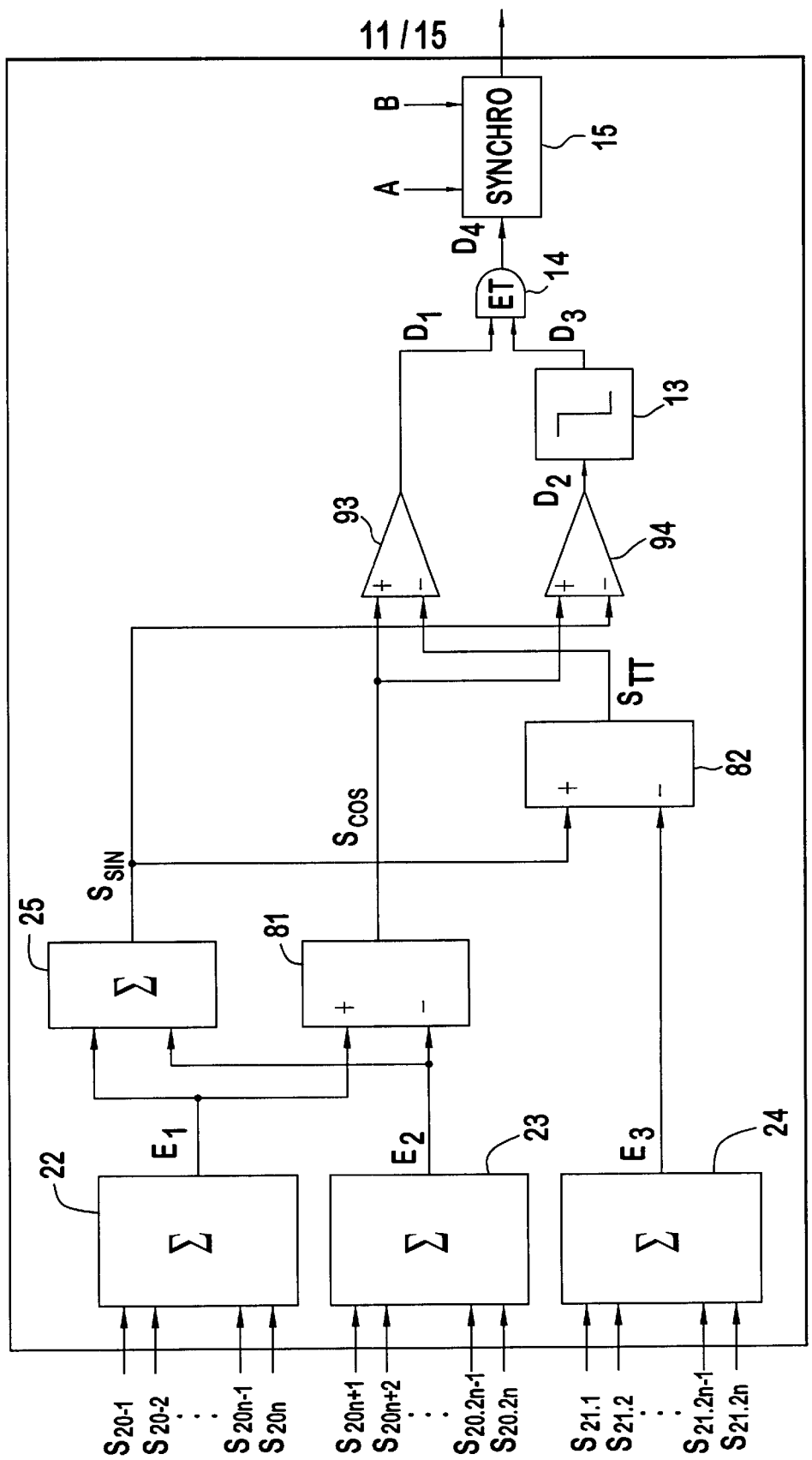
Figure 12:
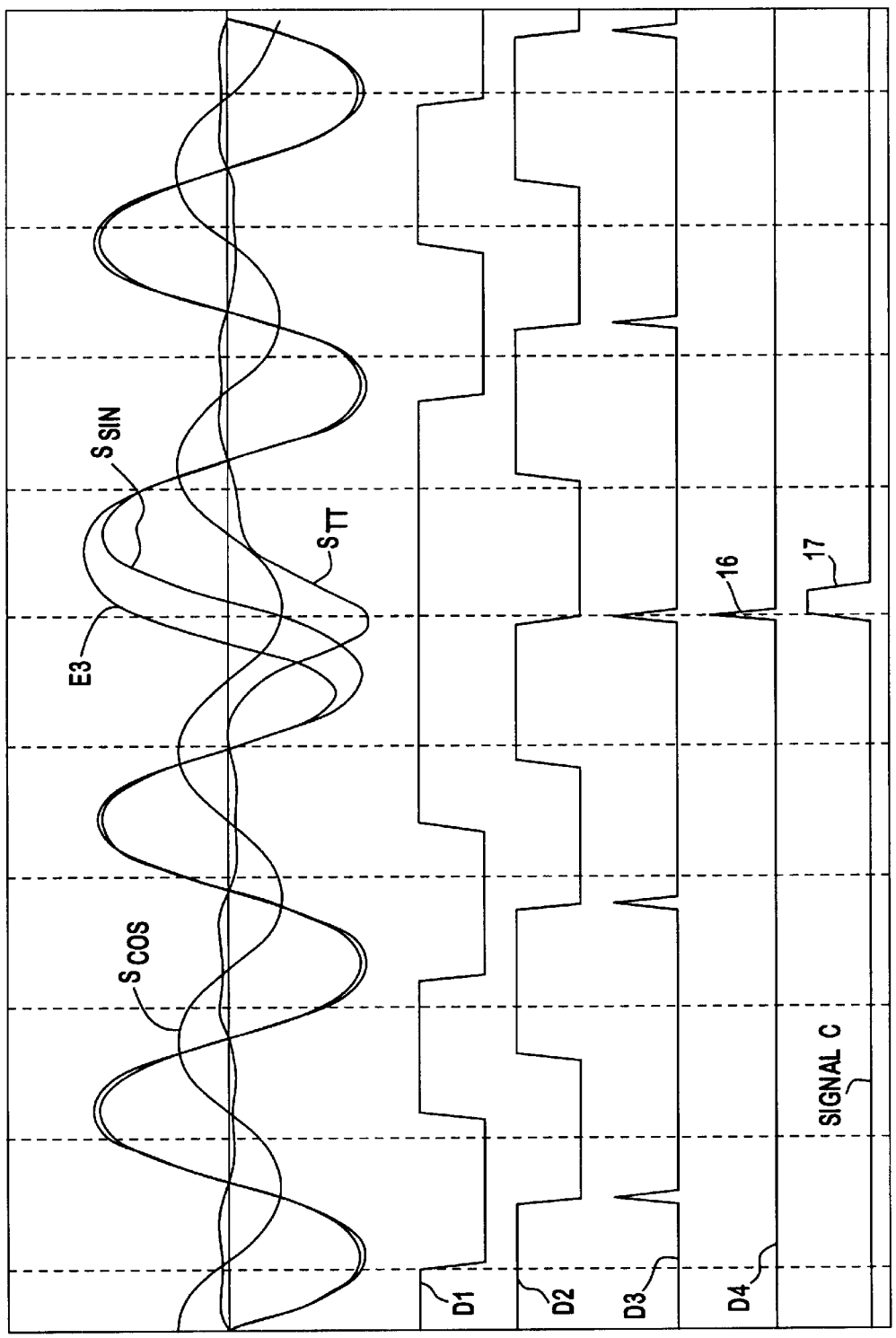
Figure 13:
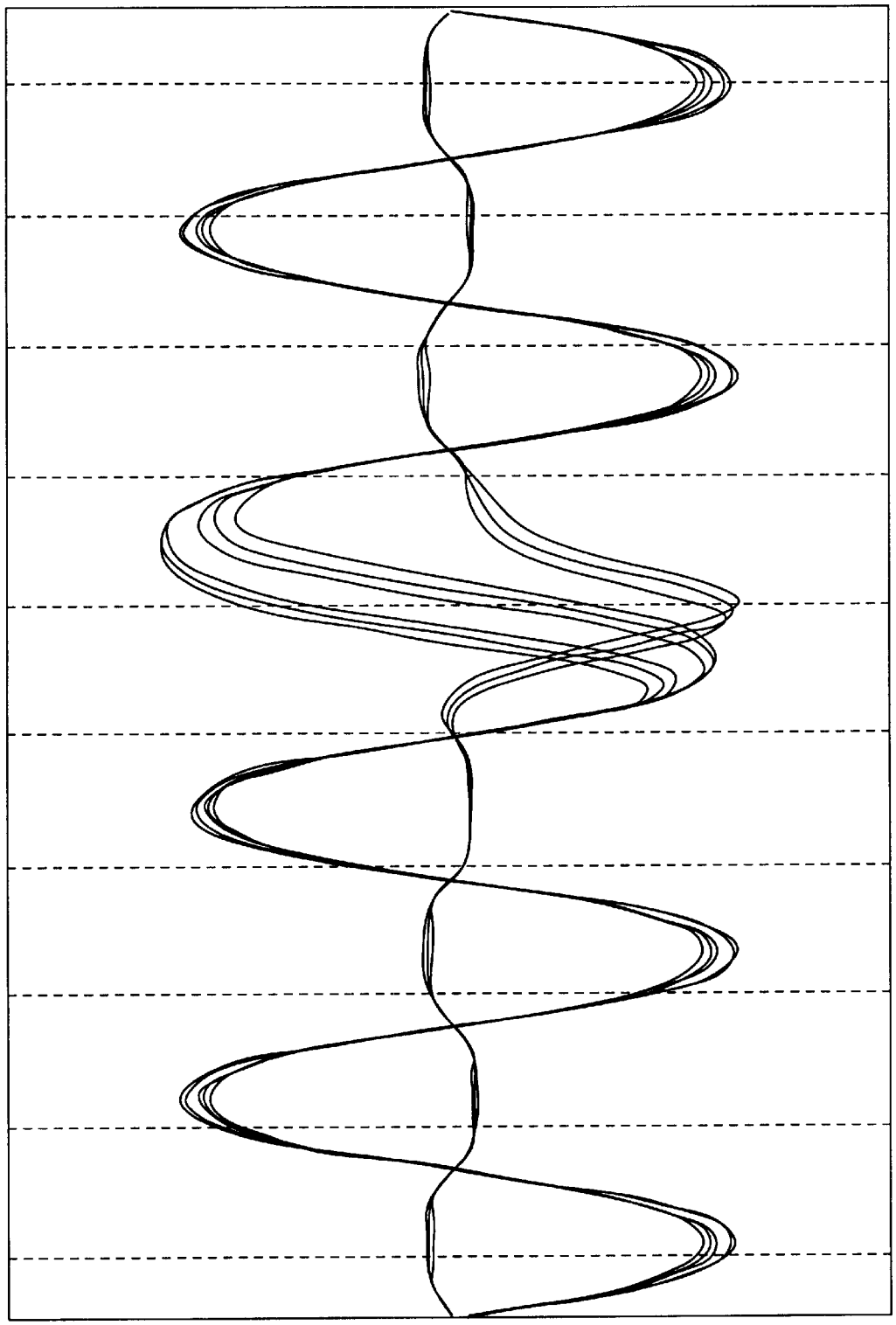
Figure 14:
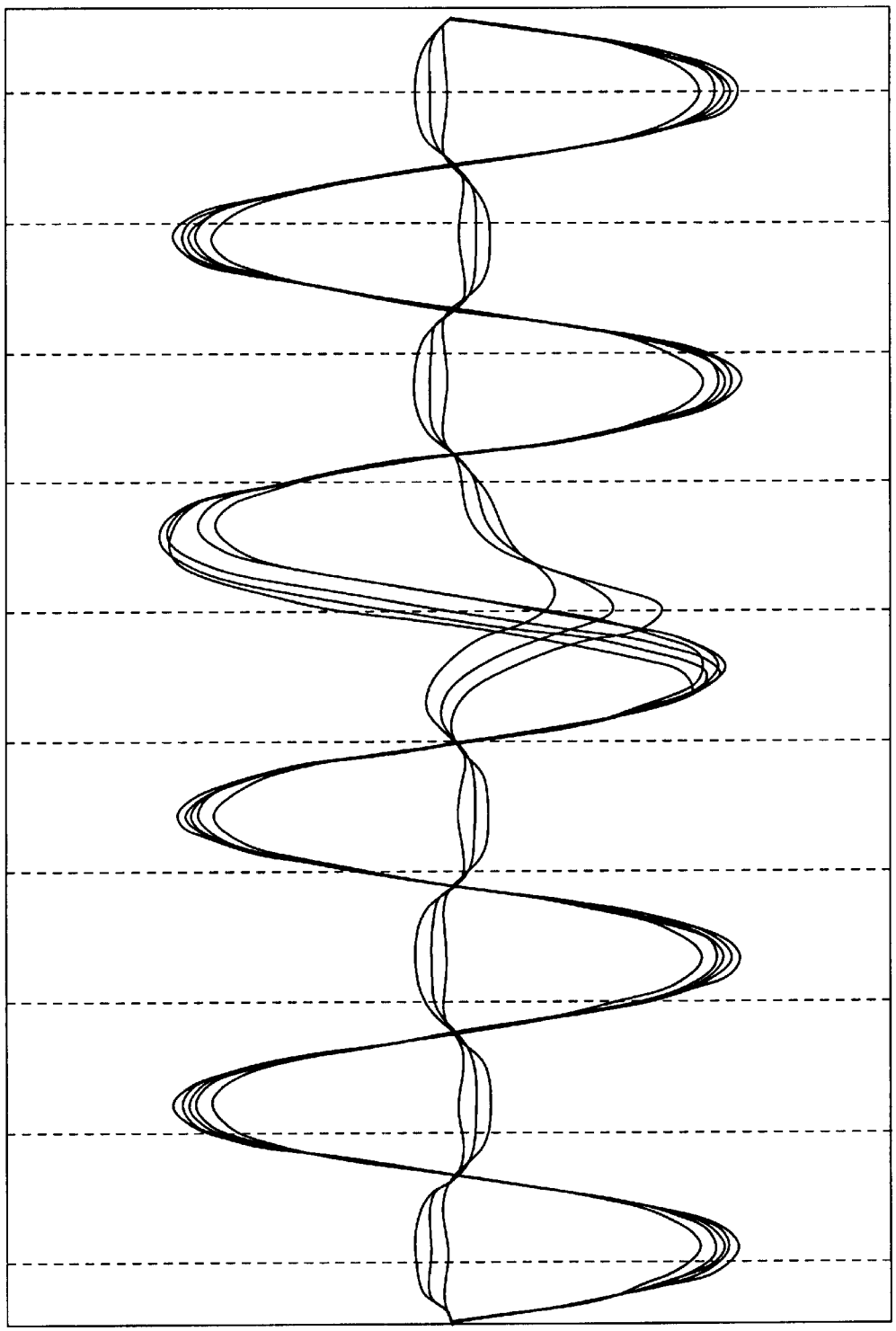
Figure 15:
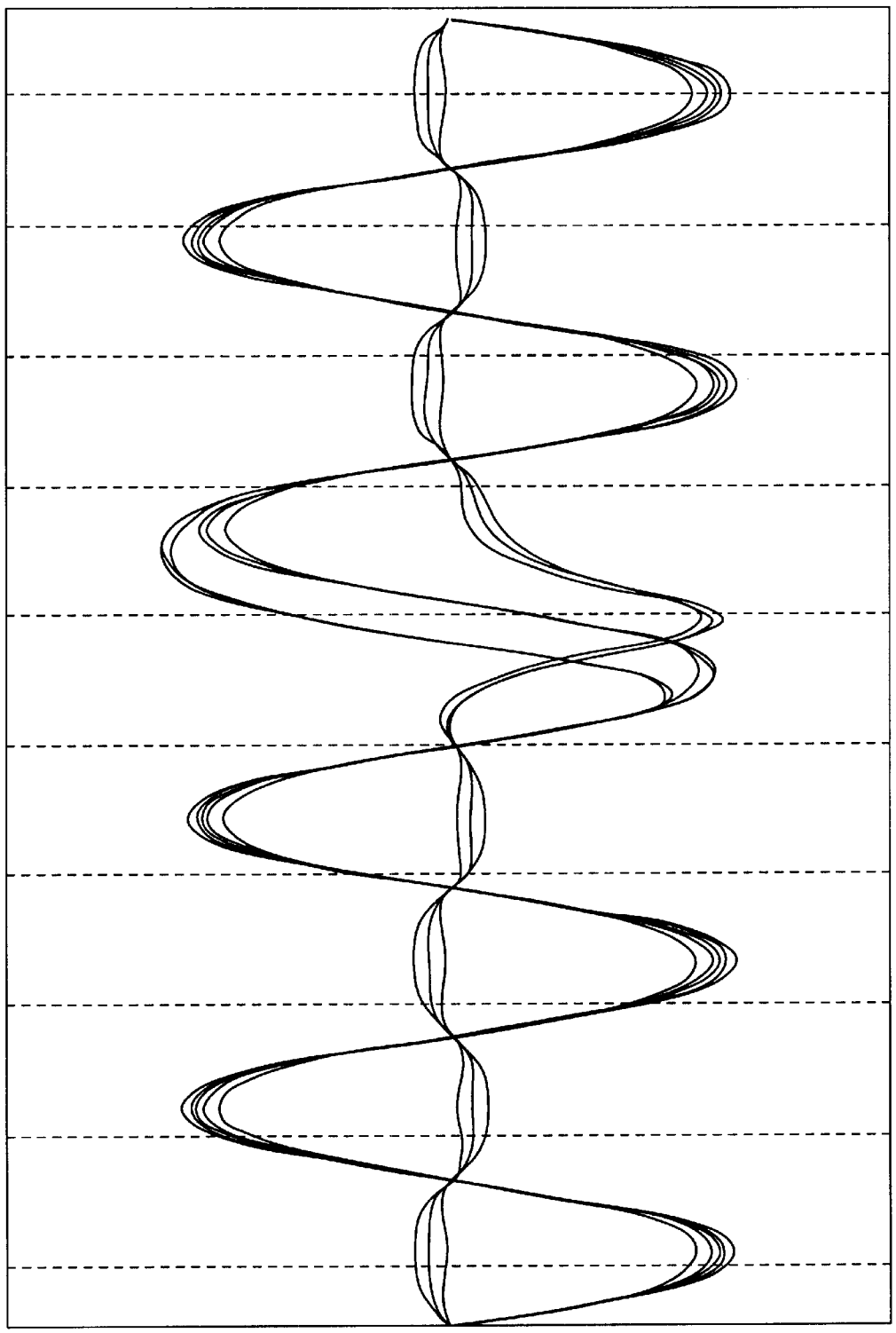

FIG. 1 is a graphic representation of the output signals of a prior art digital sensor of relative position with a "revolution tick" reference pulse;

FIGS. 2, 7, and 10 are front views of different embodiments, each illustrating a portion of a digital sensor according to the invention;

FIGS. $3_a$ and $3_b$ are graphic representations of the magnetic field profiles observed along a radius of a multipolar magnetic encoder;

FIGS. $4_a$–$4_j$ illustrate different magnetic patterns of a digital sensor according to the invention;

FIGS. 5, 8, and 11 are electronic diagrams illustrating different embodiments of the device for processing of the signals of the digital sensor according to the invention;

FIGS. 6, 9, and 12 are graphic representations of the electrical signals available in the processing device of the digital sensor according to the invention; and FIGS. 13 through 15 illustrate different characteristic analog electrical signals of the processing device of different digital sensors according to the invention.

The elements bearing the same references, in the different figures, fulfill the same functions in view of the same or similar results.

DETAILED DESCRIPTION

Referring now to the drawings, the digital sensor of relative position, to which the invention relates, includes a circular multipolar magnetic ring 1, illustrated in FIG. 2, to be connected to the mobile part of a component whose relative angular position is being measured, in such a way that it is put in rotation at the same time as this component. As shown by FIG. 2, the magnetic ring 1 has, on one of its surfaces, a number of equally distributed north and south poles, succeeding one another in such a way that a north pole, or respectively a south pole, is always surrounded by two south poles, or respectively north poles. The angular width of the north and south poles remains constant.

The digital sensor of the present invention also has at least two sensitive elements 6 and 7, a length d apart along a radius r, and which are respectively positioned facing a main track 4 and a "revolution tick" reference track 5. Sensitive element 6 of magnetic sensor device 11 reads the magnetic field emitted by the main magnetic track 4, whereas simultaneously, sensitive element 7 reads the magnetic field emitted by the reference track 5. According to a fundamental characteristic of the invention, the magnetic ring 1 has a specific magnetic pattern 10, formed by two adjacent poles, north and south, separated by a magnetic transition of particular shape, different from the theoretical radial transition between the other poles of the ring, so that the angular width of the north and south poles of the angular pattern, at the "revolution tick" reference track 5, is different from those of the other poles.

In a first embodiment, corresponding to the particular case of FIG. 2, in which the main magnetic track 4 is a circle dividing the magnetic ring 1 into two parts of equal widths, the magnetic transition 3 between adjacent north and south poles of magnetic pattern 10, occurs along a line segment, inclined by an angle $\alpha$ with respect to the direction of the transitions between other north and south poles of the magnetic ring, in this case the same as radius r of the ring, illustrated as a dotted line, the center R of the rotation by angle a being on the main track 4. Second sensitive element 7 of magnetic sensor device 11 is situated on a circle with a different diameter, in this case greater than that of the main track 4, so that the magnetic field which it reads on this reference track has a particularity with regard to the site of the magnetic pattern 10 whose adjacent north and south poles are of different widths. In the case of a magnetic ring whose exterior cylindrical surface is magnetized producing a linear multipolar magnetic encoder, on which the transitions between the poles are the same as the directrixes of the exterior cylindrical ring, the pattern has a transition inclined by an angle $\alpha$ with respect to the transition between the other poles.

Figure 3A:
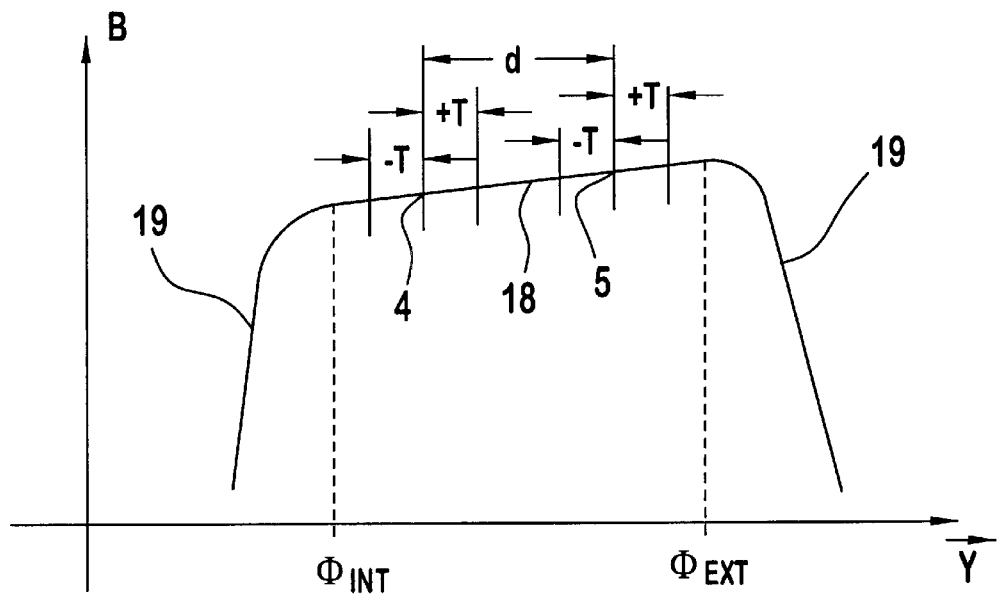
Figure 3B:
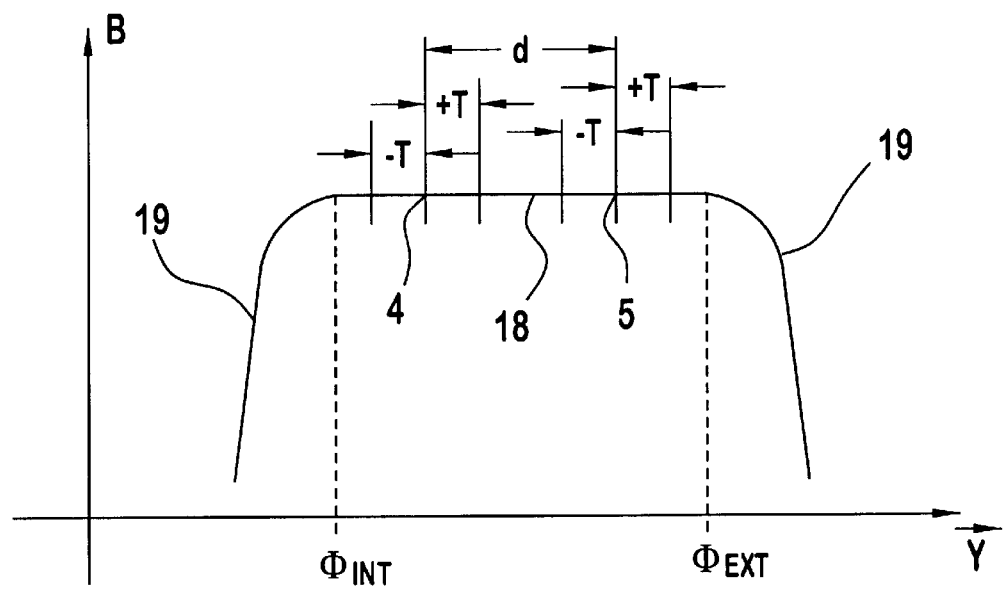
Figure 4A:
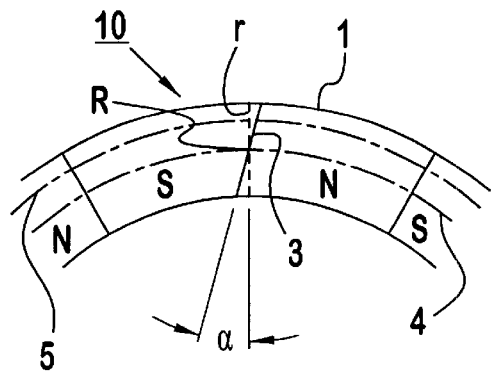
Figure 4B:
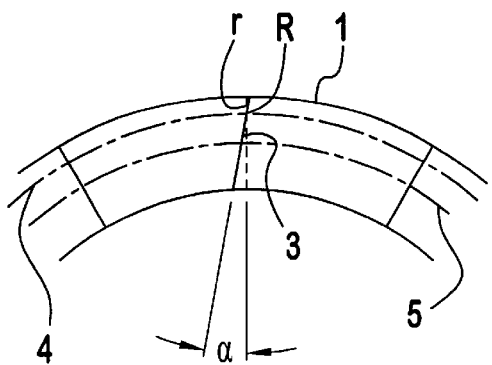
Figure 4C:
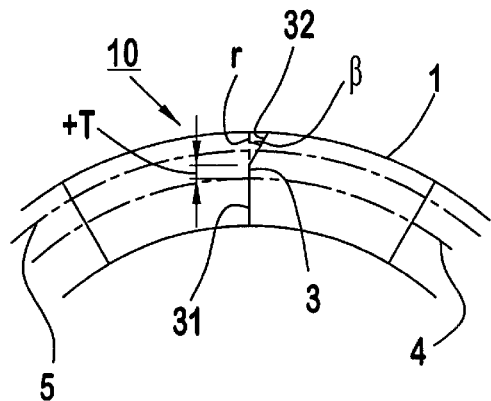
Figure 4D:
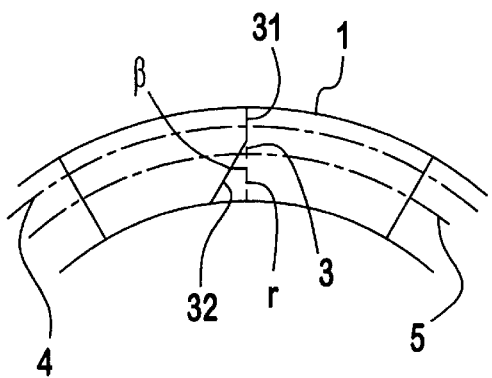
Figure 4E:
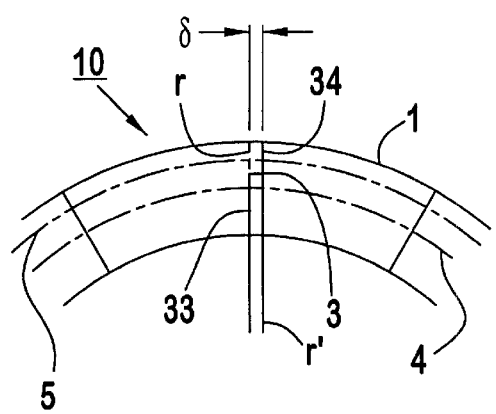
Figure 4F:
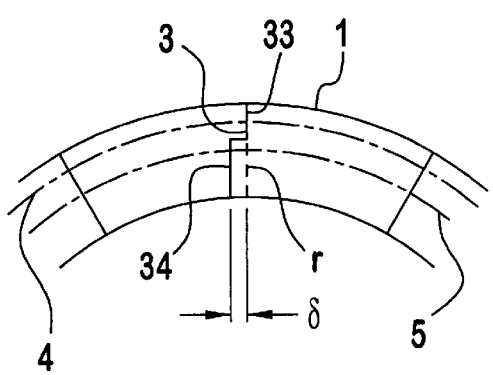
Figure 4G:
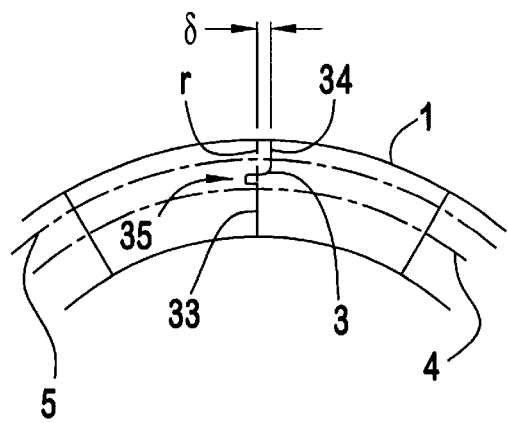
Figure 4H:
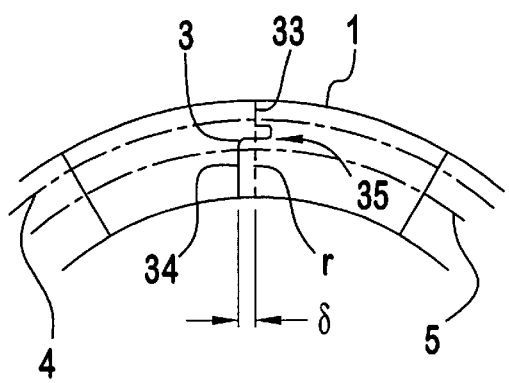
Figure 4I:
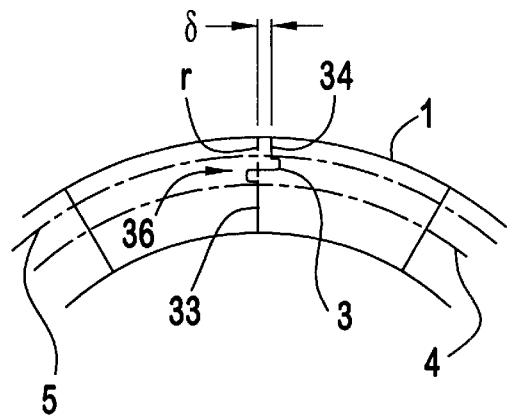
Figure 4J:
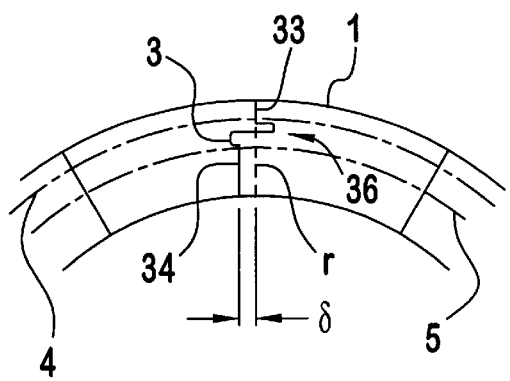

FIGS. 3$_a$ and 3$_b$ illustrate a typical reading of the magnetic field B available according to a direction y passing through a radius of the multipolar magnetic ring 1, preferably at the center of the pole, respectively in the case of a ring of which one of the surfaces is magnetized and in the case of a linear ring. Each of the two curves has plateau 18 above the magnetized magnetic material, between the interior diameter $\Phi_{INT}$ and exterior diameter $\Phi_{EXT}$, and decreases in region 19 when one approaches the edge of the magnetized part. With d representing the distance between the sensitive elements placed above the two magnetic tracks 4 and 5, and with 2T representing the mechanical tolerances of positioning according to the direction of a radius y of sensor 11 with respect to tracks 4 and 5, in order to be free of the tolerances of mounting according to this radius y, it is necessary for the length of plateau 18 to be at least equal to d+2T in order to obtain a constant effective magnetic field and a suitable functioning of the specific "revolution tick" processing.

FIGS. 4$_a$ and 4$_b$ represent magnetic pattern 10 produced on magnetic ring 1, whose main track is not centered in the middle but offset towards the interior diameter in FIG. 4$_a$ and towards the exterior diameter in FIG. 4$_b$, respectively. The transition occurs as that of FIG. 2, that is to say according to a line segment obtained by rotation of a radius r with angle $\alpha$ and center R located on the main track 4. This design enables one to optimize the width of the magnetic ring, by reducing its width, for example. FIGS. 4$_c$ and 4$_d$ represent a second embodiment of magnetic pattern 10, whose specific transition 3 is comprised of two line segments, a first segment 31 along a radius r of the magnetic ring 1 which divides the pattern into two equal parts, maintaining a constant angular pole width at the site of the main track 4 as well as at the site of the adjacent diameters situated at ±2T, and a second segment 32 inclined by an angle $\beta$ with respect to the first segment at the site of reference track 5.

In FIGS. 4$_e$ and 4$_f$, magnetic transition 3 between the two north and south poles of magnetic pattern 10 is comprised of first line segment 33, which is the same as radius r of magnetic ring 1, dividing magnetic pattern 10 into two equal parts, along the conventional transition at the main track 4 and of the adjacent diameters at ±2T, and a second line segment 34, which is the same as radius r', offset by angle $\delta$ with respect to radius r. This second line segment divides the magnetic pattern 10 into two unequal parts but maintains a constant angular pole width at the reference track 5 and at the adjacent diameters at ±2T, during the electronic processing of the "revolution tick" reference signal, whether the magnetic ring 1 is magnetized on a flat surface or on its exterior cylindrical ring. A variant of the preceding transition is represented in FIGS. 4$_g$ and 4$_h$, in which case the line segments 33 and 34, at the two magnetic tracks 4 and 5, are connected at the middle of the magnetic ring 1 by a curvilinear line segment 35 which attenuates the magnetic influences between the tracks. Another variant of the same type of transition is represented in FIGS. 4$_i$ and 4$_j$, in which case the line segments 33 and 34 are connected by a curvilinear line segment 36 in the shape of an S at the middle of the ring.

The two sensitive elements 6 and 7 of the magnetic sensor device 11 respectively deliver electric signals $S_6$ and $S_7$, the electronic processing of which by specific device 12 enables one to obtain a "revolution tick" reference signal C, which is represented in FIG. 5. This device 12 for generation of a reference pulse consists first of all of a differentiating circuit 8, which executes the analog difference between the input signals $S_6$ and $S_7$, in order to deliver an analog "revolution tick" reference signal $S_{TT}$. Device 12 then consists of a comparator circuit 9, which compares the analog reference signal $S_{TT}$ with a set reference threshold $S_{SE}$, which is chosen to be between the upper and lower limits of signal $S_{TT}$, regardless of the temperature of functioning. Thus, the amplitude of the analog reference signal $S_{TT}$ is weighted, on one hand, by a first factor of functioning at the high temperatures, which decreases it at transition between the north and south poles of the magnetic pattern 10, and on the other hand, by a second factor of functioning at the low temperatures, which increases it outside of the pattern. At the output of comparator 9, a digital "revolution tick" reference signal is generated, which is used as a reference pulse, whether electrical signals $S_6$, $S_7$, $S_{TT}$ and $S_{SE}$ are voltages or currents.

These different signals are represented graphically in FIG. 6, in the case of the portion of the multipolar magnetic ring 1 which is considered in FIG. 2. In order to be free of the influence of the variations of temperature, on one hand, and of the air gap, on the other hand, the air gap being the distance between the surface of the multipolar magnetic ring 1 and the sensitive elements of the magnetic sensor 11, the invention provides electronic processing of the signals emitted by the sensitive elements of magnetic sensor 11 which is ratiometric with respect to another signal whose amplitude varies in parallel thereto. In effect, the magnetic field as well as the sensitivity of the magnetic sensors decrease considerably when the temperature increases, just as the magnetic field decreases also when the air gap increases. So, it is advantageous to take into account the conjunction of these two physical phenomena.

According to a first variant of execution of the magnetic sensor 11, which is part of the digital sensor of relative position according to the invention, the magnetic sensor 11 is composed of three sensitive elements, a first sensitive element 7 facing the reference track 5 as in the preceding embodiment and second and sensitive elements 61 and 62 facing the main magnetic track 4 in order read the magnetic field emitted by multipolar magnetic ring 1. These sensitive elements 61 and 62, one of which is situated on the same radius of the magnetic ring as the first sensitive element 7, are offset with respect to one another along the main track 4 in such a way that when one of these sensitive elements, 61 for example, faces a magnetic transition between adjacent north and south poles, the other element, 62 in this case, faces the middle of a magnetic pole; in other words they are in quadrature. In the case of FIG. 7, the two sensitive elements 61 and 62 of the main track 4 appear above the same south pole, but since the magnetic ring is rotating, they can be above two distinct poles.

The electronic processing of signals $S_{61}$, $S_{62}$ and $S_7$, emitted at the output of the magnetic sensor 11, is done by device 120 for generation of reference pulse C, which includes, as shown by FIG. 8, first of all, differentiating circuit 80, for executing the difference between signal $S_{61}$ emitted by the sensor element 61 of the main track 4 and signal $S_7$ emitted by sensor element 7 of reference track 5 situated on the same radius of the magnetic ring 1 as the reference track 5. This results in analog "revolution tick" reference signal $S_{TT}$. Device 120 then includes two comparator circuits 91 and 92. The first comparator circuit 91 compares signal $S_{62}$ of sensitive element 62 in quadrature with sensitive element 61, with analog "revolution tick" signal $S_{TT}$, in order to deliver digital signal $D_1$ which is in logic state 1 when signal $S_{62}$ is greater than signal $S_{TT}$ and in logic state 0 when the opposite is true. Second comparator 92 compares this same signal $S_{62}$ with signal $S_{61}$ emitted by the other sensitive element 61, in order to deliver digital signal $D_2$, which is in logic state 1 when signal $S_{62}$ is greater than signal $S_{61}$ and in logic state 0 when the opposite is true. Comparator 92 is connected to descending front detector 13, whose output signal $D_3$ generates a pulse with each descending front of logic signal $D_2$. Then, binary signals $D_1$ and $D_3$ enter AND logic gate 14, in order to generate digital signal $D_4$ consisting of a single pulse 16 per revolution of the multipolar magnetic ring 1.

The group of these signals which have been described is represented graphically in FIG. 9. This single pulse 16, which only appears once per revolution and always at the same position with respect to the magnetic ring 1, serves as a rising front for reference pulse 17 of binary "revolution tick" signal C, of which the duration of the high state is adjusted with respect to the desired output signal by synchronization circuit 15, which receives, as input, digital signal $D_4$ as well as signals A and B. This embodiment of generating device 120 is a nonlimiting example.

According to a second variant of execution of the sensitive elements of the invention, the digital sensor of relative position includes two bars of sensitive magnetic elements 20 and 21, which are intended to free one, on one hand, from a precise positioning between two consecutive elements situated facing main magnetic track 4, and on the other hand, from taking into account the different possible angular widths of the north and south poles. As shown by FIG. 10, bars 20 and 21, situated facing the two magnetic tracks, the main track 4 and the "revolution tick" reference track 5, are parallel and a length d apart, and are composed of a number of respective sensitive elements $20_i$ and $21_i$, i being a positive whole number, preferably even and equal for the two bars, each sensitive element of one bar facing a sensitive element of the other bar.

Device 121 for generation of "revolution tick" reference signal C, according to FIG. 11, has a first analog summing means 22 for summing of the first half of the signals coming from bar 20, which are referenced $S_{20(1)}$ to $S_{20(n)}$ in order to deliver analog signal $E_1$, and a second analog summing means 23 for summing of the second half of the signals coming from this same bar 20, referenced $S_{20(n+1)}$ to $S_{20(2n)}$ in order to deliver another analog signal $E_2$, and a third analog summing means 24 for summing of the signals coming from second bar 21 which deliver third analog signal $E_3$. Device 121 then has an analog circuit 25 for summing of signals $E_1$ and $E_2$, coming from the first and second analog summing means 22 and 23, which delivers analog signal $S_{SIN}$, and then first and second analog differentiating circuits 81 and 82, one of which 81 executes the difference between signals $E_1$ and $E_2$ coming from first and second analog summing means 22 and 23 in order to deliver analog signal $S_{COS}$ and the other of which 82 executes the difference between signal $S_{SIN}$ and signal $E_3$ coming respectively from analog circuit summing means 25 and third analog summing means 24. The output signal of differentiating circuit 82 is analog "revolution tick" reference signal $S_{TT}$.

As in the case of the preceding variant of execution, generating device 121 then includes two comparators, a first comparator 93 which compares signal $S_{COS}$ coming from the differentiator with analog "revolution tick" signal $S_{TT}$ in order to deliver digital signal $D_1$ which is in the logic state 1 when signal $S_{COS}$ is greater than $S_{TT}$ and in the logic state 0 in the case to the contrary, and a second comparator 94 which compares this same signal $S_{COS}$ with signal $S_{SIN}$ coming from analog circuit summing means 25 in order to deliver digital signal $D_2$, which is equal to 1 when signal $S_{COS}$ is greater than $S_{SIN}$ and equal to 0 in the case to the contrary. Second comparator 94 is connected to descending front detector 13, whose output signal $D_3$ generates a pulse at each descending front of logic signal $D_2$. AND logic gate 14, which receives binary signals $D_1$ and $D_3$, generates digital signal $D_4$ in the form of a single pulse 16 per revolution of magnetic ring 1. Synchronization circuit 15 receives this single pulse per revolution, as well as signals A and B, in order to adjust the length of the high state of reference pulse 17 of "revolution tick" output signal C with respect to the desired output signal. FIG. 12 is a graphic representation of the different signals obtained in the course of the electronic processing of the signals coming from the bars of magnetic sensor elements.

FIGS. 13, 14 and 15 are graphic representations of the electrical signals $E_3$, $S_{SIN}$ and of the "revolution tick"

reference signal $S_{TT}$, which were described in the preceding description, and their equivalents on the diameters at + or −2T, relative to FIGS. 4a–4b, 4c–4d and 4e–4j.

From the above description, it will be apparent that the present invention provides a digital sensor of relative position that produces a "revolution tick" reference signal, of reduced dimensions and capable of being free of the various tolerances of assembly of the magnetic sensor elements with regard to the multipolar magnetic rings connected in rotation with rotating components. The sensitive elements of the sensor 6, 7, 61 and 62 as well as the bars 20 and 21 can be of the Hall-effect probe, amorphous magnetoresistant probe or giant magnetoresistant probe type. The present invention may be used advantageously in sensor bearings for automobile applications such as navigation and checking of trajectory, by the intermediary of wheel or steering column bearings, or for industrial applications when it is necessary to check or control the position of a component, for example, an electric motor.

Having described the invention, what is claimed is:

1. A digital sensor of relative position, comprising:
    a circular multipolar magnetic ring, on which are magnetized a number of pairs of north and south poles, which are equally distributed, of constant determined angular width, mobile in rotation opposite a stationary magnetic sensor comprised of at least two sensitive elements, which are situated on a radius (r) of the magnetic ring and a length (d) apart, respectively positioned facing a main track and a "revolution tick" reference track; and
    a device for processing of output signals emitted by the sensitive elements, for providing one reference pulse per revolution of a component in rotation connected with the magnetic ring;
    wherein on the magnetic ring, a magnetic pattern is produced from a pair of north and south poles whose transition is different from the transition between the other north and south poles of the magnetic ring, and of which the angular width of the north pole is, on one hand, equal to that of the south pole at the main track, and on the other hand, different at the "revolution tick" reference track.

2. A digital sensor according to claim 1, wherein the transition between one pair of adjacent north and south poles of the magnetic pattern is a line segment, rotated by an angle (α) with respect to the direction of the transitions between the north and south poles of the other poles of the magnetic ring, the angle (α) being generated by rotating the line segment about an origin (R), occurring at the intersection of the main track and a radius of the magnetic ring, and lying equidistant between the two adjacent transitions, with angle (α) being the acute angle between the radius and the line segment.

3. A digital sensor according to claim 1, wherein the transition between one pair of adjacent north and south poles of the magnetic pattern is comprised of two line segments, a first segment directed along a radius of the magnetic ring which divides the magnetic pattern into two equal parts, maintaining a constant angular pole width at the main track, and a second segment rotated by an angle (β) with respect to the first segment at the reference track.

4. A digital sensor according to claim 1, wherein the transition between one pair of adjacent north and south poles of the magnetic pattern is comprised of two line segments, one of which is directed along the same radius (r) of the magnetic ring, dividing the magnetic pattern into two equal parts, and the other of which is directed along a radius (r'), offset by an angle (δ) with respect to the radius (r), dividing the magnetic pattern into two unequal parts.

5. A digital sensor according to claim 4, wherein the two line segments are connected by an arc of a circle.

6. A digital sensor according to claim 4, wherein the line segments, situated at the main track and the reference track, are connected at the middle of the magnetic ring by a curvilinear line segment for attenuating magnetic influences between the main track and the reference track.

7. A digital sensor according to claim 4, wherein the line segments, situated at the main track and the reference track, are connected at the middle of the magnetic ring by a curvilinear line segment in the shape of an S at the middle of the magnetic pattern.

8. A digital sensor according to claim 1, wherein the magnetic ring has a magnetization profile, along a radius at the center of a pole, having a plateau region and two decreasing regions towards the interior and exterior diameters of the magnetic ring, the length of the plateau region being at least equal to the sum of the distance (d), between the sensitive elements of the sensor respectively facing the main track and the reference track, and, because each of the sensitive elements may be placed a distance plus or minus T (known as tolerance) from its track along a radius of the magnetic ring, the length of the plateau region must then be at least equal to the distance between the sensitive elements plus 2T.

9. A digital sensor according to claim 1, wherein the magnetic sensor comprises three sensitive elements, a first sensitive element facing the reference track and second and third sensitive elements facing the main track in such a way that one of the second and third sensitive elements is on the same radius (r) of the magnetic ring as the first sensitive element a distance (d) from the first sensitive element, the second and third sensitive elements being offset with respect to one another along the main track so as to deliver respective signals in quadrature, namely when one of these sensitive elements faces a magnetic transition between adjacent north and south poles, the other sensitive element faces the middle of a magnetic pole.

10. A digital sensor according to claim 9, wherein the device for electronic processing of the signals coming from the three sensitive elements of the magnetic sensor includes:
    a differentiating circuit, which executes the analog difference between signal ($S_{61}$) emitted by the first sensitive element facing the main track and signal ($S_7$) emitted by the second sensitive element facing the reference track and located on the same radius of the magnetic ring as the reference track, and delivering an analog "revolution tick" reference signal ($S_{TT}$);
    a first comparator circuit, which compares the signal ($S_{62}$) of the third sensitive element in quadrature with the second sensitive element, with analog "revolution tick" signal ($S_{TT}$), in order to deliver digital signal ($D_1$) which is in logic state 1 when signal ($S_{62}$) is greater than signal ($S_{TT}$) and in logic state 0 when the opposite is true;
    a second comparator, which compares this same signal ($S_{62}$) with signal ($S_{61}$) emitted by the second sensitive element, in order to deliver digital signal ($D_2$), which is in logic state 1 when signal ($S_{62}$) is greater than signal ($S_{61}$) and in logic state 0 when the opposite is true;
    a descending front detector connected to the second comparator, whose output signal ($D_3$) generates a pulse with each descending front of the logic signal ($D_2$);
    an AND logic gate, which receives, as input, binary signals ($D_1$ and $D_3$) in order to generate a digital signal ($D_4$) consisting of a single pulse per revolution of the magnetic ring, always appearing at the same position with respect to the magnetic ring; and a synchronization circuit, which receives, as input, digital signal ($D_4$) as well as other signals (A and B) and which generates a digital "revolution tick" reference signal (C).

11. A digital sensor according to claim 1, wherein the magnetic sensor is comprised of two small bars of sensitive magnetic elements, facing the two magnetic tracks, the main track and the "revolution tick" reference track, the sensitive magnetic elements being parallel and a length (d) apart and each being comprised of a number of respective sensitive elements, the number being a positive whole number, each sensitive element of one bar facing a sensitive element of the other bar.

12. A digital sensor according to claim 11, wherein the device for electronic processing of the signals coming from the two sensitive bars includes:

first analog summing means for summing of the first half of the signals coming from the first bar, which are referenced, delivering an analog signal ($E_1$);

second analog summing means for summing of the second half of the signals coming from the first bar, referenced, delivering a second analog signal ($E_2$);

third analog summing means for summing of the signals coming from second bar, delivering a third analog signal ($E_3$);

a circuit for analog summing of the signals ($E_1$ and $E_2$), coming from summing means (22 and 23), which delivers analog signal ($S_{SIN}$);

a first analog differentiating circuit, which executes the difference of signals ($E_1$ and $E_2$) coming from first analog summing means in order to deliver analog signal ($S_{COS}$);

a second analog differentiating circuit, which executes the difference between signal ($S_{SIN}$) and signal ($E_3$) coming respectively from the third and second analog summing means in order to deliver analog "revolution tick" reference signal ($S_{TT}$);

a first comparator, which compares signal ($S_{COS}$) coming from the first analog differentiating circuit with analog "revolution tick" signal ($S_{TT}$) in order to deliver digital signal ($D_1$) which is in the logic state 1 when signal ($S_{COS}$) is greater than ($S_{TT}$) and in the logic state 0 in the case to the contrary;

a second comparator, which compares this same signal ($S_{COS}$) with signal ($S_{SIN}$) coming from circuit for analog summing in order to deliver digital signal ($D_2$), which is equal to 1 when signal ($S_{COS}$) is greater than ($S_{SIN}$) and equal to 0 in the case to the contrary;

a descending front detector, connected to the second comparator, generating pulse ($D_3$) at each descending front of logic signal ($D_2$);

an AND logic gate (14), which receives binary signals ($D_1$ and $D_3$), which generates digital signal ($D_4$) in the form of a single pulse per revolution of magnetic ring 1; and a synchronization circuit which receives this single pulse per revolution, as well as other signals (A and B), in order to generate the "revolution tick" output signal (C).

13. A digital sensor according to claim 1, wherein the device for electronic processing of the signals ($S_6$ and $S_7$) coming from the two sensitive elements of the magnetic sensor includes:

a differentiating circuit, which executes the analog difference between input signals ($S_6$ and $S_7$), in order to deliver an analog "revolution tick" reference signal ($S_{TT}$); and a comparator circuit, which compares the analog reference signal ($S_{TT}$) with a set reference threshold ($S_{SE}$), between upper and lower limits of signal ($S_{TT}$), and which generates a digital "revolution tick" reference signal (C), which is used as a reference pulse.

14. A digital sensor according to claim 1, wherein the sensitive elements of the sensor are of the Hall-effect probe type.

15. A digital sensor according to claim 1, wherein the sensitive elements of the sensor are of the amorphous magneto-resistant probe type.

16. A digital sensor according to claim 1, wherein the sensitive elements of the sensor are of the giant magneto-resistant probe type.

* * * * *

UNITED STATES PATENT AND TRADEMARK OFFICE
CERTIFICATE OF CORRECTION

PATENT NO. : 6,400,143 B1
DATED : June 4, 2002
INVENTOR(S) : Francis Travostino, A. John Santos, Mark E. LaCroix and Stephen J. Lyle It is certified that error appears in the above-identified patent and that said Letters Patent is hereby corrected as shown below:

<u>Column 3,</u>
Line 40, delete "a" and insert -- $\alpha$ --.

<u>Column 9,</u>
Line 22, after "referenced", insert -- $[S_{20(1)}$ to $S_{20(n)}]$ --.
Line 25, after "referenced", insert -- $[S_{20(n+1)}$ to $S_{20(2n)}]$ --.

Signed and Sealed this

Eighth Day of October, 2002

*Attest:*

JAMES E. ROGAN
*Attesting Officer*     *Director of the United States Patent and Trademark Office*